3,014,880
MIXED CRYSTALS AND PROCESS FOR THEIR PREPARATION

Rudolf Bemmann, Mannheim, and Wolfgang Langenbeck, Hans Dreyer, and Dietwart Nehring, Rostock, Germany, assignors to VEB Leuna-Werke "Walter Ulbricht," Leuna, Germany
No Drawing. Filed Nov. 10, 1958, Ser. No. 772,659
Claims priority, application Austria, Nov. 11, 1957
12 Claims. (Cl. 252—443)

The present invention relates generally to mixed crystals and is particularly directed to a process for the preparation of catalytically highly active mixed crystals which are useful as, for example, hydrogenation catalysts.

It is a well established fact that mixed crystals are formed by isomorphous substances if (a) they are similar chemically and (b) the sizes of the atoms, ions or molecules are approximately equal. In the formation of mixed crystals, the metrical correspondence of the structures is more important than chemical similarity (see Kirk-Othmer, Encyclopedia of Chemical Technology).

It is moreover known in the art to prepare catalytically active mixed crystals, e.g., for hydrogenation purposes, by first dissolving in water a catalytically active metal in the form of its nitrate or sulfate and a catalytically inactive carrier metal likewise in the form of its nitrate or sulfate, and thereafter jointly precipitating the salt solutions with weak or strong alkali. In doing so, precipitates comprising mixed crystals are obtained, provided the metal salts employed (a) have the same anion, (b) crystallize in the same crystal system and (c) have the same lattice constant or the lattice constants (ion radius) differ not more than 7%. The precipitate thus obtained is subsequently washed and dried, whereafter it is decomposed in reducing manner in a hydrogen stream to obtain a catalyst. The catalysts obtained by this procedure are relatively active.

An examination of the precipitates obtained in the manner hereinbefore described resulted in the following findings:

If sodium carbonate or another relatively mild alkali is used for precipitating the metal salts, then the precipitate consists of a mixture of metal carbonates and hydroxides. It is generally very difficult to filter such a precipitate, the filterability, although always poor, being dependent to some extent on the conditions prevailing during the preparation. The catalytic activity of the catalysts obtained from the precipitate by decomposition with hydrogen is, however, satisfactory.

If, however, sodium hydroxide or another strong alkali is used for the preparation of the precipitates from the metal salt solution, true metal hydroxides are obtained. The filterability of these hydroxides is exceedingly poor, which may be attributed to their gel-like consistency. The catalytic activity of catalysts which may be prepared from the mixed hydroxides referred to amounts to but 30-50% of the first-mentioned catalysts, i.e., of the mixed crystals obtained by precipitation with a mild alkali.

It is a primary object of this invention to provide a process for the preparation of catalytically active mixed crystals having a catalytic activity which considerably exceeds that of the catalysts referred to.

A further object of the invention is the provision of a process of the kind referred to wherein mixed crystals of superior filterability are obtained.

Considered from a different aspect, the invention has as its object to provide for a process for the preparation of true mixed crystals from a mechanical mixture of metal carbonates, metal oxides or metal hydroxides.

In accordance with the present invention we have ascertained that the catalytic activity of catalysts obtained from mixed carbonates or mixed hydroxides of the kind referred to is considerably increased by subjecting the basic mixed carbonates or mixed hydroxides in aqueous solution after their precipitation from the respective salt solutions to the prolonged action of $CO_2$ under pressure and at elevated temperatures.

We have found that the $CO_2$ treatment should advantageously be performed in an autoclave for several hours within a temperature range of 50–250° C., preferably 100–200° C. and under a pressure of 10–200, preferably 40–100, atmospheres. In doing so, the precipitates that have been obtained by precipitation with sodium carbonate or the like mild alkali are converted into true crystalline mixed carbonates, while precipitates obtained by precipitation with strong alkali, i.e., the mixed hydroxides referred to, are converted into a mixture of hydroxides and carbonates. With regard to the $CO_2$ treatment of the latter type of precipitates we have established that the carbonate content in the resulting product increases with the length of the treatment time and with higher treatment temperatures. The catalytic activity of catalysts prepared from the products after the $CO_2$ treatment referred to was on the average 60–100% greater than that of catalysts obtained from the precipitates without intermediate $CO_2$ treatment.

The inventive $CO_2$ treatment was performed under varying conditions while closely observing and studying the reaction course. For this purpose the treatment was frequently interrupted at predetermined intervals in order to record any changes in the crystalline structure on microfilm. We found that $CO_2$ treatment under the given preferred conditions caused a marked growth of the crystals. This increase in the size of the crystals made itself noticeable by a considerably improved filterability. In fact, we were surprised to find that the $CO_2$ treated precipitates settled so rapidly, that they could be purified by a few washings and decantations to such an extent that the wash water was negative to the diphenylamine test for the presence of nitrate ions. It will be readily realized that the improved filterability and resulting simplified purification of the treated precipitates constitutes a further important advantage.

The considerable crystal growth caused by the inventive $CO_2$ treatment prompted us to utilize the $CO_2$ treatment for a novel manner of preparing true mixed crystals. After extensive research and many experiments, we consequently found that true mixed crystals are formed by subjecting a mechanically prepared mixture of two metal carbonates, e.g., a carbonate of a catalytically active metal and a carbonate of a catalytically inactive carrier metal in the presence of water to the inventive $CO_2$ treatment under pressure and at elevated temperature. Due to the relatively good solubility of both carbonates under $CO_2$ pressure a portion of the crystals dissolves and precipitates in the form of mixed crystals on still undissolved crystals of the mixture. Catalysts obtained in that manner from a mechanical carbonate mixture exhibit about the same catalytic activity as that of catalysts obtained from the precipitates subjected to the $CO_2$ treatment. The mechanical carbonate mixture proper, however, has but a negligible catalytic activity.

Analogous to the preparation of mixed crystals from a mechanical carbonate mixture, it is feasible to subject a mechanical mixture of two oxides or hydroxides to the inventive $CO_2$ treatment under pressure in the presence of water. Also in this case mixed crystals are obtained that yield highly active catalysts after reducing decomposition.

The mole ratio between the metals is not affected or altered by the $CO_2$ treatment. Thus, if the metals are, for example, Ni and Mg, the same ratio Ni:Mg is preserved. The differences in the weight percentages after the treatment should be attributed on the one hand to the replacement of OH-groups by $CO_3$-groups during the $CO_2$ pressure treatment, and on the other hand to the different water content of the mixed carbonates, which, however, has no bearing on the preparation of the catalysts.

It should be noted that the replacement of OH-groups by $CO_3$ groups is incomplete if the inventive $CO_2$ treatment under pressure is performed at relatively low temperatures. In this case the mixed carbonates obtained by the treatment are but partly crystalline. Further, if magnesium is one of the metals, considerable quantities of magnesium carbonate, probably in the form of bicarbonate, are dissolved if the treatment is carried out at low temperatures. As previously mentioned the preferred temperature range is between about 100–200° C. It is possible to operate at temperatures above 200° which, however, makes the process unnecessarily more costly.

The inventive $CO_2$ treatment performed under relatively low pressures and at relatively high temperatures causes a very marked crystal growth of the mixed carbonates. These mixed carbonate crystals are, however, compact to such an extent that it is sometimes difficult to effect the reducing decomposition of the crystals. If the reducing decomposition is incomplete, the resulting catalyst exhibits, of course, less than maximum activity. It is feasible partly to overcome this drawback by mechanically comminuting the large mixed crystals, whereby the activity of the catalysts upon reducing decomposition of the comminuted crystals will be better than without such comminution. Obviously, however, such comminution entails further costs. For this reason, it is advantageous to proceed under the optimum conditions previously indicated whereby finely crystalline carbonates are obtained which are readily worked up into the desired catalysts. No useful purpose would be served by comminuting these finely crystalline carbonates since the catalytic activity would not be enhanced thereby.

To perform the inventive $CO_2$ treatment at pressures above the indicated values is not worthwhile since the additional expenditure with regard to apparatus resulting therefrom would not be economically sound. The same applies with regard to extending the treatment time above the 8 to 40 hours indicated in the examples.

The invention will now be described by several examples. It should be understood, however, that these examples are given by way of illustration rather than by way of limitation and that many changes may be made in, for example, the choice of starting materials, temperatures, pressures and process conditions in general without affecting in any way the scope and spirit of this invention as recited in the appended claims. It will furthermore be noted that the examples are given in the form of comparisons so as clearly to indicate that the catalytic activity of catalysts obtained by the inventive procedure is greatly improved as compared with catalysts which have not been subjected to the inventive treatment.

*Example 1*

The following procedure was performed on mixed nickel-magnesium carbonate which was obtained by jointly precipitating nickel nitrate and magnesium nitrate with sodium carbonate. The precipitate, i.e., the mixed carbonate was thereafter divided into two portions. For comparison purposes the first portion was treated in accordance with a prior art process as follows: The mixed carbonate was placed into a suction filter and was washed therein for eight hours with distilled water, while testing the wash water for the presence of nitrate ions. No nitrate ions could be detected after eight hours of washing. Upon drying the remaining precipitate at 130° C. it contained 21.2% of nickel, 14.5% of magnesium, 8.03% of carbon and 2.02% of hydrogen. (The theoretical carbon value for a pure mixed carbonate would be 11.50% of carbon.) A mixed carbonate quantity of this kind which contained 100 milligrams of nickel was thereafter reducingly decomposed in a stream of hydrogen for 2.5 hours at a temperature of 400° C. The hydrogen stream was adjusted to 20 liters per hour. The catalyst thus obtained was capable of hydrogenating five milliliters of cyclohexene in 34 minutes at room temperature. The catalyst obtained from the first portion referred to was thus prepared in accordance with prior art processes and, consequently, exhibited a catalytic activity corresponding to such known catalysts.

The second portion of the mixed carbonate obtained by precipitation with sodium carbonate was thereafter treated in accordance with the invention in an aqueous solution with carbon dioxide ($CO_2$) for eight hours at 100° C. under a pressure of 70 to 80 atmospheres. Upon cooling to about 80° C. the excess carbon dioxide was released and the precipitate thus obtained was filtered off on a suction filter. The precipitate was then washed on the filter with distilled water. In contrast to the prior art procedure described in the beginning of this example, the wash water was free from nitrate ions already after 10 minutes of washing. The precipitate was thereafter dried at 130° C., whereafter it contained 19.6% of nickel, 17.0% of magnesium, 12.41% of carbon and 0.067% of hydrogen (the theoretical amount of carbon would be 12.43%). A mixed carbonate thus obtained, containing 100 milligrams of nickel, and after reducing decomposition under the conditions described above, was capable of hydrogenating 5 milliliters of cyclohexene in 14 minutes.

From the above comparison example it will be readily seen that, on the one hand, the filtration proceeded much more readily in the second case, that is, the nitrate ions remaining from the original precipitation of the nickel-magnesium nitrate with sodium carbonate were washed out much more rapidly, while on the other hand the catalytic activity of the catalyst was considerably improved after the inventive $CO_2$ treatment under pressure.

*Example 2*

A mixed nickel-magnesium carbonate which had been obtained by precipitation with sodium carbonate contained 20.2% of nickel, 16.9% of magnesium, 8.04% of carbon and 1.00% of hydrogen (the theoretical value for a pure mixed carbonate would be 12.4% of carbon). An amount of this mixed carbonate which contained 100 milligrams of nickel was thereafter reducingly decomposed by a hydrogen stream for 2.5 hours at 400° C., the hydrogen stream being adjusted to 20 liters per hour. The catalyst thus obtained was capable of hydrogenating 5 milliliters of cyclohexene in 35 minutes at room temperature.

Another portion of the precipitated mixed carbonate of the above indicated composition was treated in aqueous suspension with carbon dioxide for 14 hours at 15° C. and under a pressure of 50 atmospheres. After this treatment the mixed salt had the following composition: 47.3% of nickel, 0.5% of magnesium, 5.5% of carbon and 0.96% of hydrogen (the theoretical amount of carbon would be 9.9). A quantity of mixed carbonate of the composition mentioned above which contained 100 milligrams of nickel was decomposed in reducing manner under the conditions mentioned above. The catalyst thus obtained was for practical purposes inactive in the hydrogenation of cyclohexene.

Another portion of the precipitated mixed carbonate of the composition given above was treated in aqueous suspension with $CO_2$ for 14 hours at 50° C. under a pressure of 55 atmospheres. After this treatment the mixed salt had the following composition: 27.7% of nickel, 12.3% of magnesium, 9.3% of carbon and 0.71% of hydrogen. (The theoretical value for a pure mixed carbonate would be 11.1% of carbon.) A mixed carbonate quantity of the kind referred to which contained 100 milligrams of nickel and after reducing decomposition at 320° C. for 2.5 hours was capable of hydrogenating 5 milliliters of cyclohexene in 21 minutes.

A still further portion of the precipitated mixed carbonate of the indicated composition was thereafter treated in aqueous suspension with carbon dioxide for 8 hours at 100° C. under a pressure of 65 atmospheres. After this treatment the mixed salt had the following composition: 19.8% of nickel, 16.4% of magnesium, 11.2% of carbon and 0.01% of hydrogen (the theoretical amount: 11.9% of carbon). A mixed carbonate quantity which contained 100 milligrams of nickel, was capable of hydrogenating 5 milliliters of cyclohexene in 18 minutes after having been decomposed in reducing manner under the conditions as described above.

A still further part of the precipitated mixed carbonate of the above indicated composition was treated in aqueous suspension with carbon dioxide for 14 hours at 200° C. and under a pressure of 100 atmospheres. The mixed salt exhibited the following composition after this treatment: 19.6% of nickel, 16.5% of magnesium, 12.3% of carbon, and 0.002% of hydrogen. (The theoretical amount: 12.4% of carbon.)

A mixed carbonate quantity of this kind and containing 100 milligrams of nickel was thereafter decomposed reducingly as described above, whereafter it was capable of hydrogenating 5 milliliters of cyclohexene in 14 minutes.

Example 3

A nickel-magnesium mixed carbonate which was obtained by precipitation with sodium carbonate contained 24.0% of nickel, 13.6% of magnesium, 6.9% of carbon and 0.95% of hydrogen. (The theoretical value for pure mixed carbonate would be 9.8% of carbon.)

A mixed carbonate quantity of the above composition which contained 100 milligrams of nickel was thereafter decomposed in reducing manner in a stream of hydrogen of 20 liters per hour for 2.5 hours at 350° C. The catalyst thus obtained was capable of hydrogenating 5 milliliters of cyclohexene in 35 minutes at room temperature.

Another portion of the mixed carbonate mentioned above and having the above indicated composition was treated in aqueous suspension with carbon dioxide for 14 hours at 150° C. and under a pressure of 17 atmospheres. After this treatment the mixed salt had the following composition: 25.1% of nickel, 14.0% of magnesium, 12.0% of carbon and 0.03% of hydrogen (the theoretical amount of carbon would be 12.0%.) A mixed carbonate quantity containing 100 milligrams of nickel was thereafter decomposed reducingly under the conditions described above, whereafter it was capable of hydrogenating 5 milliliters of cyclohexene in 40 minutes. The mixed crystals obtained by the $CO_2$ treatment under pressure were rather large. For this reason they were comminuted in a ball mill for 8 hours. Thus comminuted crystals containing 100 milligrams of nickel were capable of hydrogenating 5 milliliters of cyclohexene in 25 minutes after first having been subjected to the reducing decomposition as described above.

A further portion of the mixed precipitated carbonate of the first mentioned composition was treated in aqueous suspension with carbon dioxide for 14 hours at 150° C. under a pressure of 35 atmospheres. The mixed salt had the following composition after this treatment: 25.7% of nickel, 13.7% of magnesium, 12.0% of carbon, and 0.07% of hydrogen (theoretical amount: 12.0% of carbon). An amount of this mixed carbonate which contained 100 milligrams of nickel was thereafter decomposed reducingly under the above-mentioned conditions whereafter it was capable of hydrogenating 5 milliliters of cyclohexene in 37 minutes.

The mixed crystals obtained in this manner were also in this case relatively large so that they were comminuted in a ball mill for 8 hours. A mixed carbonate quantity comminuted in this manner which contained 100 milligrams of nickel was capable of hydrogenating 5 milliliters of cyclohexene in 19 minutes, after first having been subjected to the reducing decomposition referred to above.

A still further portion of the mixed precipitated carbonate of the first indicated composition was treated with carbon dioxide in aqueous suspension for 14 hours at 150° C. and under a pressure of 50 atmospheres. After this treatment the mixed salt had the following composition: 25.5% of nickel, 13.8% of magnesium, 12.0% of carbon, and 0.06% of hydrogen (theoretically: 12.0% of carbon). A mixed carbonate quantity of this composition containing 100 milligrams of nickel was thereafter decomposed reducingly in the manner referred to, whereafter it was capable of hydrogenating 5 milliliters of cyclohexene in 18 minutes.

Example 4

A nickel-magnesium mixed carbonate which was obtained by precipitation with sodium carbonate contained 22.4% of nickel, 14.0% of magnesium, 7.4% of carbon, and 1.0% of hydrogen (the theoretical amount of carbon would be 11.5%). A portion of this mixed carbonate which contained 100 milligrams of nickel was thereafter decomposed in a reducing atmosphere with a stream of hydrogen (20 liters per hour) for 2.5 hours at 400° C. The catalyst thus obtained was capable of hydrogenating 5 milliliters of cyclohexene in 32 minutes at room temperature.

Another portion of the precipitated mixed carbonate of the above-indicated composition was treated in aqueous suspension with the carbon dioxide for 2 hours at 150° C. and under a pressure of 75 atmospheres. The mixed salt had the following composition after this treatment: 23.1% of nickel, 15.0% of magnesium, 10.8% of carbon, and 0.5% of hydrogen (theoretically: 12.1% of carbon). A mixed carbonate quantity of this kind containing 100 milligrams of nickel was decomposed reducingly as described above, whereafter it was capable of hydrogenating 5 milliliters of cyclohexene in 16 minutes.

A still further portion of the precipitated mixed carbonate of the first mentioned composition was treated in aqueous suspension with carbon dioxide for 4 hours at 150° C. under a pressure of 75 atmospheres. After this treatment the mixed salt had the following composition: 22.8% of nickel, 14.4% of magnesium, 12.0% of carbon, and 0.02% of hydrogen (theoretically: 11.98% of carbon). A mixed carbonate amount containing 100 milligrams of nickel was thereafter reduced in the manner referred to, whereafter it was capable of hydrogenating 5 milliliters of cyclohexene in 15 minutes.

A further portion of the precipitated mixed carbonate of the first mentioned composition was treated with carbon dioxide in aqueous suspension for 8 hours at 150° C. under a pressure of 75 atmospheres. The mixed salt had the following composition after this treatment: 22.8% of nickel, 14.4% of magnesium, 12.1% of carbon, and 0.02% of hydrogen (theoretical amount: 11.96% of carbon). A mixed carbonate quantity of this kind containing 100 milligrams of nickel was thereafter decomposed reducingly as described previously, whereafter it was capable of hydrogenating 5 milliliters of cyclohexene in 14 minutes.

A further portion of the precipitated mixed carbonate of the first-mentioned composition was treated with carbon dioxide in aqueous suspension for 20 hours at 150° C. and under a pressure of 75 atmospheres. After this treatment the mixed salt had the following composition: 24.6% of nickel, 15.3% of magnesium, 12.2% of carbon, and 0.01% of hydrogen (theoretical amount: 12.4% of carbon). A mixed carbonate amount of this kind containing 100 milligrams of nickel was thereafter reducingly decomposed in the above-indicated manner, whereafter it was capable of hydrogenating 5 milliliters of cyclohexene in 14 minutes.

Example 5

A nickel-zinc mixed carbonate, which was obtained by precipitation with sodium carbonate, contained 21.0% of nickel, 35.5% of zinc, 3.73% of carbon, and 1.75% of hydrogen (the theoretical value for a pure mixed carbonate would be 10.72% of carbon). A mixed carbonate quantity of this kind containing 200 milligrams of nickel was thereafter decomposed reducingly in a stream of hydrogen (20 liters per hour) for 2.5 hours at 350° C. The catalyst thus obtained was capable of hydrogenating 5 milliliters of cyclohexene in 38 minutes at room temperature.

Another portion of the mixed carbonate obtained by the precipitation of soda and having the above-indicated composition was treated in aqueous solution with carbon dioxide for 8 hours at 150° C. under a pressure of 70 to 80 atmospheres. The mixed salt had the following composition after this treatment: 18.5% of nickel, 32.0% of zinc, 9.65% of carbon and 0.11% of hydrogen (theoretical amount: 9.67% of carbon). An amount of this mixed carbonate containing 200 milligrams of nickel was thereafter decomposed reducingly under the conditions previously mentioned, whereafter the catalyst obtained was capable of hydrogenating 5 milliliters of cyclohexene in 20 minutes.

Example 6

A cobalt-magnesium mixed carbonate which was obtained by precipitation with sodium carbonate contained 23.3% of cobalt, 14.4% of magnesium, 8.27% of carbon and 2.08% of hydrogen (theoretical amount for pure mixed carbonate: 11.88% of carbon). A mixed carbonate quantity of the kind indicated containing 100 milligrams of cobalt was thereafter reducingly decomposed in a stream of hydrogen (20 liters per hour) for 2.5 hours at 400° C. The thus produced catalyst was capable of hydrogenating 5 milliliters of cyclohexene in 40 minutes at room temperature.

A portion of the precipitated mixed carbonate of the first-mentioned composition was treated with carbon dioxide in aqueous solution for 8 hours at 150° C. and under a pressure of 70 to 80 atmospheres. The mixed salt had the following composition after this treatment: 19.4% of cobalt, 17.3% of magnesium, 12.03% of carbon, and 0.29% of hydrogen (theoretical amount: 12.50% of carbon). A mixed carbonate quantity of this kind containing 100 milligrams of cobalt was thereafter reducingly decomposed under the conditions previously described, whereafter it was capable of hydrogenating 5 milliliters of cyclohexene in 18 minutes.

Example 7

A nickel-magnesium mixed hydroxide which was obtained by precipitation with sodium hydroxide (NaOH) contained 36.4% of nickel and 19.0% of magnesium. A mixed hydroxide quantity of this kind and containing 100 milligrams of nickel was thereafter reducingly decomposed in a stream of hydrogen (20 liters per hour) for 2.5 hours at 400° C. The catalyst thus otbained was capable of hydrogenating 5 milliliters of cyclohexene in 60 minutes at room temperature.

A portion of the mixed hydroxide referred to above, which had been obtained by the precipitation with sodium hydroxide and having the above-indicated composition, was treated in aqueous solution with carbon dioxide for 20 hours at 150° C. and under a pressure of 70 to 80 atmospheres. After this treatment the mixed salt had the following composition: 38.2% of nickel, 6.9% of magnesium, 6.93% of carbon and 1.32% of hydrogen (theoretical amount of pure mixed carbonate: 11.20% of carbon). A mixed salt quantity of this kind and containing 100 milligrams of nickel was subjected to the reducing decomposition referred to above, whereafter it was capable of hydrogenating 5 millimeters of cyclohexene in 20 minutes.

Example 8

A copper-calcium mixed carbonate which had been obtained by precipitation with sodium carbonate contained 34.5% of copper, 10.8% of calcium, 6.45% of carbon and 1.68% of hydrogen (theoretically: 9.75% of carbon). A quantity of this mixed carbonate thus described and containing 200 milligrams of copper was thereafter decomposed reducingly in a stream of hydrogen (20 liters per hour) for 2 hours at 260° C. The catalyst thus obtained was capable of hydrogenating at 250° C. 1 milliliter of nitrobenzene in 3 minutes with a yield of aniline of 56%.

Another portion of the mixed copper-calcium carbonate obtained by the precipitation with sodium carbonate and having the above-indicated composition was then treated in aqueous solution with carbon dioxide for 8 hours at 150° C. and under a pressure of 70 to 80 atmospheres. After this treatment the mixed carbonate had the following composition: 35.5% of copper, 14.8% of calcium, 7.18% of carbon, and 0.68% of hydrogen (theoretical amount: 11.12% of carbon). A mixed salt quantity of this kind containing 200 milligrams of copper, was thereafter subjected to the reducing decomposition previously referred to, whereafter the catalyst obtained was capable of hydrogenating one millimeter of nitrobenzene in 3 minutes with an aniline yield of 71%.

Example 9

The inventive process was performed on a mechanically produced mixture of nickel carbonate and magnesium carbonate. This mixture contained 23.2% of nickel, 11.0% of magnesium, 6.98% of carbon, and 2.37% of hydrogen (the theoretical amount of carbon for a pure mixed carbonate would be 10.19%). A mixture of this kind which contained 100 milligrams of nickel was thereafter decomposed in a reducing manner in a stream of hydrogen (20 liters per hour) for 2.5 hours at 350° C. The catalyst thus obtained was capable of hydrogenating 3 milliliters of cyclohexene at room temperature within 8 hours.

Another portion of the mechanical crystal mixture referred to above and having the above-indicated composition was thereafter treated with carbon dioxide in aqueous solution for 14 hours at 150° C. and under a pressure of 70 to 80 atmospheres. After this treatment a mixed carbonate of the following composition had been formed: 26.7% of nickel, 12.5% of magnesium, 11.76% of carbon, and 0.11% of hydrogen (theoretical amount: 11.63% of carbon). A mixed carbonate quantity of this kind and containing 100 milligrams of nickel was thereafter subjected to the reducing decomposition treatment previously referred to, whereafter it was capable of hydrogenating 5 milliliters of cyclohexene in 16 minutes.

While the invention has been described in connection with the preparation of mixed crystals containing two metal carbonates, i.e., an active and an inactive metal carbonate, it will be readily realized that it would be perfectly possible to prepare mixed crystals comprising the carbonates of two or more metals of each group without having to alter the procedure.

From the preceding description it will be obvious that our invention provides for a process for the preparation of mixed crystals of at least two metal carbonates in which a composition of the formula $$aM_1(X)_n/bM_2(X)_n$$

wherein $a$ and $b$ stand for the number of moles, which may be different from each other, $M_1$ stands for a catalytically active metal, $M_2$ is a catalytically inactive metal, $X$ is carbonate, hydroxide, oxide or a mixture of part carbonate and hydroxide an $n$ is an integer to satisfy the valence of the respective metal, is subjected in water to a $CO_2$ treatment under pressure and at elevated temperature until mixed crystals of relatively large size have been obtained. The preferred temperature range is 50–250° C., preferably 100–200° C., the preferred pressure range is 10–200, preferably 40–200 atmospheres while the treatment time depends on the nature of the salts. A treatment period of 8–40 hours is, however, generally sufficient. Upon decomposition of the mixed crystals thus obtained by hydrogen at elevated temperature highly active catalysts are obtained.

What we claim is:

1. A process for the preparation of mixed crystals of at least two metal carbonates, which comprises subjecting in the presence of water to the action of carbon dioxide at a temperature between about 50° and 200° C. and under a pressure between about 10 and 200 atmospheres a composition selected from the group consisting of mechanical mixtures and coprecipitates having the general formula $$M_1(X)_n + M_2(X)_n$$

wherein $M_1$ stands for a metal active in hydrogenation catalysis, $M_2$ stands for a metal selected from the group consisting of Ca, Mg, and Zn, said last mentioned metals being catalytically inactive, X is selected from the class consisting of carbonate, hydroxide, oxide and carbonate-hydroxide mixtures, and $n$ is an integer of a value to satisfy the valence of $M_1$ and $M_2$, respectively.

2. The process of claim 1, wherein said composition is a precipitate obtained by the joint precipitation of salt solutions of said metals with a mild alkali.

3. The process of claim 1, wherein said composition is a precipitate obtained by the joint precipitation of salt solutions of said metals with a strong alkali.

4. The process of claim 1, wherein said composition is subjected to said $CO_2$ treatment for between 8–40 hours.

5. The process of claim 1, wherein said $CO_2$ treatment is carried out at a temperature of between about 100–200° C.

6. The process of claim 1, wherein said $CO_2$ treatment is carried out under a pressure of between about 40–100 atmospheres.

7. The process of claim 1, wherein said $CO_2$ treatment is carried out in an aqueous suspension.

8. The process of claim 2, wherein said mild alkali is sodium carbonate.

9. The process of claim 3, wherein said strong alkali is sodium hydroxide.

10. A process for the preparation of mixed crystals of at least two metal carbonates, which comprises subjecting in the presence of water to the action of carbon dioxide at a temperature between about 50° and 200° C. and under a pressure between about 10 and 200 atmospheres a composition selected from the group consisting of mechanical mixtures and coprecipitates having the general formula $$M_1(X)_n + M_2(X)_n$$

wherein $M_1$ stands for a metal active in hydrogenation catalysis, $M_2$ stands for a metal selected from the group consisting of Ca, Mg, and Zn, said last mentioned metals being catalytically inactive, X is selected from the class consisting of carbonate, hydroxide, oxide and carbonate-hydroxide mixtures, and $n$ is an integer of a value to satisfy the valence of $M_1$ and $M_2$, respectively and decomposing the mixed crystals thus obtained in a stream of hydrogen.

11. As a new composition of matter mixed crystals of large size of at least two metal carbonates and obtained by subjecting in the presence of water to the action of carbon dioxide at a temperature between about 50° and 200° C. and under a pressure between about 10 and 200 atmospheres a composition selected from the group consisting of mechanical mixtures and coprecipitates having the general formula $$M_1(X)_n + M_2(X)_n$$

wherein $M_1$ stands for a metal active in hydrogenation catalysis, $M_2$ stands for a metal selected from the group consisting of Ca, Mg, and Zn, said last mentioned metals being catalytically inactive, X is selected from the class consisting of carbonate, hydroxide, oxide and carbonate-hydroxide mixtures, and $n$ is an integer of a value to satisfy the valence of $M_1$ and $M_2$, respectively.

12. As a new composition of matter mixed crystals of large size of at least two metal carbonates and obtained by subjecting in the presence of water to the action of carbon dioxide at a temperature between about 50° and 200° C. and under a pressure of between about 10 and 200 atmospheres a composition selected from the group consisting of mechanical mixtures and coprecipitates having the general formula $$M_1(X)_n + M_2(X)_n$$

wherein $M_1$ stands for a metal active in hydrogenation catalysis, $M_2$ stands for a metal selected from the group consisting of Ca, Mg, and Zn, said last mentioned metals being catalytically inactive, X is selected from the class consisting of carbonate, hydroxide, oxide and carbonate-hydroxide mixtures, and $n$ is an integer of a value to satisfy the valence of $M_1$ and $M_2$, respectively, and subsequent decomposition of the mixed crystals thus obtained in a stream of hydrogen.

References Cited in the file of this patent

UNITED STATES PATENTS

| | | |
|---|---|---|
| 2,553,415 | Kirschenbaum | May 15, 1951 |
| 2,587,599 | Corson | May 4, 1952 |